US008069217B2

United States Patent
Lo et al.

(10) Patent No.: US 8,069,217 B2
(45) Date of Patent: Nov. 29, 2011

(54) SYSTEM AND METHOD FOR PROVIDING ACCESS TO A SHARED SYSTEM IMAGE

(75) Inventors: Yuan-Chang Lo, Austin, TX (US); Stephen Luning, Austin, TX (US); Fahd Pirzada, Austin, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 287 days.

(21) Appl. No.: 12/425,280

(22) Filed: Apr. 16, 2009

(65) Prior Publication Data

US 2010/0268756 A1 Oct. 21, 2010

(51) Int. Cl.
*G06F 13/00* (2006.01)
(52) U.S. Cl. .................. 709/215; 709/214; 709/203
(58) Field of Classification Search .................. 709/215, 709/214, 203
See application file for complete search history.

(56) References Cited

U.S. PATENT DOCUMENTS

| | | | |
|---|---|---|---|
| 7,343,468 B2 | 3/2008 | Li et al. | 711/203 |
| 7,363,479 B1 | 4/2008 | Walker et al. | 713/1 |
| 7,389,401 B2 | 6/2008 | Li et al. | 711/203 |
| 7,603,532 B2 * | 10/2009 | Rajan et al. | 711/166 |
| 7,698,704 B2 * | 4/2010 | Abali et al. | 717/177 |
| 7,873,619 B1 * | 1/2011 | Faibish et al. | 707/705 |
| 2002/0133744 A1 | 9/2002 | Oldfield et al. | 714/11 |
| 2006/0085471 A1 * | 4/2006 | Rajan et al. | 707/102 |
| 2006/0184650 A1 | 8/2006 | Abali et al. | 709/220 |
| 2007/0174429 A1 | 7/2007 | Mazzaferri et al. | 709/218 |
| 2007/0266027 A1 | 11/2007 | Gattegno et al. | 707/8 |
| 2008/0183973 A1 | 7/2008 | Aquilera et al. | 711/147 |
| 2009/0248763 A1 * | 10/2009 | Rajan et al. | 707/204 |
| 2010/0094825 A1 * | 4/2010 | Kelso et al. | 707/705 |
| 2010/0146039 A1 * | 6/2010 | Lo et al. | 709/203 |
| 2011/0072069 A1 * | 3/2011 | Pirzada et al. | 709/203 |

OTHER PUBLICATIONS

Figures 1 and 2, Odds HA Arch, 1 page, Jul. 25, 2008.
Sanbolic, Software to Simplify and Share SAN Storage, Desktop Virtualization-Citrix Server High Availability, www.sanbolic.com/highAvailability.htm, 2 pages, Dec. 9, 2008.
Citrix Provisioning Server for Desktop, Breakthrough Capabilities for Delivering Physical Desktops, www.citrix.com/English/ps2/products/product.asp?contentID=1297541, 1 page, Dec. 9, 2008.

* cited by examiner

*Primary Examiner* — Kenneth R Coulter
(74) *Attorney, Agent, or Firm* — Baker Botts L.L.P.

(57) ABSTRACT

Systems and methods for providing data integrity for stored data are disclosed. A method for providing access to a remote shared image may include receiving from a first provisioning server a request to create a write space for a client communicatively coupled to the first provisioning server. The message may further include creating a partition on a first logical unit disposed in a storage array, the first logical unit communicatively coupled to the first provisioning server and associated with the client. The method may additionally include storing a thin clone of a shared image on the partition, the shared image common to the client and at least one other client and stored on a second logical unit, the thin clone comprising a write space for data specific to the client.

18 Claims, 3 Drawing Sheets

SYSTEM AND METHOD FOR PROVIDING ACCESS TO A SHARED SYSTEM IMAGE

TECHNICAL FIELD

The present disclosure relates in general to storage and processing of data, and more particularly to access to a shared system image.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems have utilized on-demand desktop streaming (ODDS) and other similar methods. ODDS is an approach used to provide a single, standard desktop image (e.g., an operating system and one or more application programs) to information handling systems from a network service. Because the shared image may be configured, delivered and managed centrally, costs associated with maintaining the network of information handling systems may be minimized, while providing greater security and flexibility. In an ODDS implementation, individual information handling systems are often communicatively coupled to one or more provisioning servers. The one or more provisioning servers are generally configured to manage input/output (I/O) communications between the individual information handling systems and a storage array communicatively coupled to the one or more provisioning servers. For example, because a user of an information handling system may write data specific to that user and not common to the shared image, an individual write space may be created for such user-specific data. Accordingly, the one or more provisioning servers may create and/or manage the user-specific write spaces, and may present a user of an information handling system with the shared image and any user-specific write space such that the user may be presented a private copy of the shared image and write space.

To ensure high availability of ODDS and similar approaches, two more provisioning servers may be employed. The use of multiple provisioning servers allows operational redundancy, such that in the event of a failure or fault of one provisioning server, another provisioning server is available to provide I/O access to information handling systems in an ODDS configuration. However, in order to support access to individual write spaces and a shared image using multiple provisioning servers, the shared image and write spaces are often managed by the provisioning servers as files in a clustered file system. Clustered file systems are often expensive to implement, and may render high-availability ODDS implementations economically infeasible in many situations.

SUMMARY

In accordance with the teachings of the present disclosure, the disadvantages and problems associated with providing access to a shared system image and associated write spaces may be reduced or eliminated.

In accordance with an embodiment of the present disclosure, a method for providing access to a remote shared image is provided. The method may include receiving from a first provisioning server a request to create a write space for a client communicatively coupled to the first provisioning server. The message may further include creating a partition on a first logical unit disposed in a storage array, the first logical unit communicatively coupled to the first provisioning server and associated with the client. The method may additionally include storing a thin clone of a shared image on the partition, the shared image common to the client and at least one other client and stored on a second logical unit, the thin clone comprising a write space for data specific to the client.

In accordance with another embodiment of the present disclosure, a system for providing access to a remote shared image may include a client, a storage array, and a plurality of provisioning servers communicatively coupled to the client and the storage array. The storage array may have a first logical unit having stored thereon a shared image common to the client and at least one other client a second logical unit. A first provisioning server of the plurality of provisioning servers may be configured to manage input/output operations communicated between the client and the partition and input/output operations communicated between the client and the shared image. The storage array may be configured to: (i) receive from the first provisioning server a request to create a write space for the client; (ii) create a partition on a first logical unit; and (iii) store a thin clone of the shared image on the partition the thin clone comprising a write space for data specific to the client.

In accordance with a further embodiment of the present disclosure, software may be embodied on a computer-readable media, the software configured to, when executed by a processor: (i) receive from a provisioning server a request to create a write space for a client communicatively coupled to the first provisioning server; (ii) create a partition on a first logical unit disposed in a storage array, the first logical unit communicatively coupled to the provisioning server and associated with the client; and (iii) store a thin clone of a shared image on the partition, the shared image common to the client and at least one other client and stored on a second logical unit, the thin clone comprising a write space for data specific to the client.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
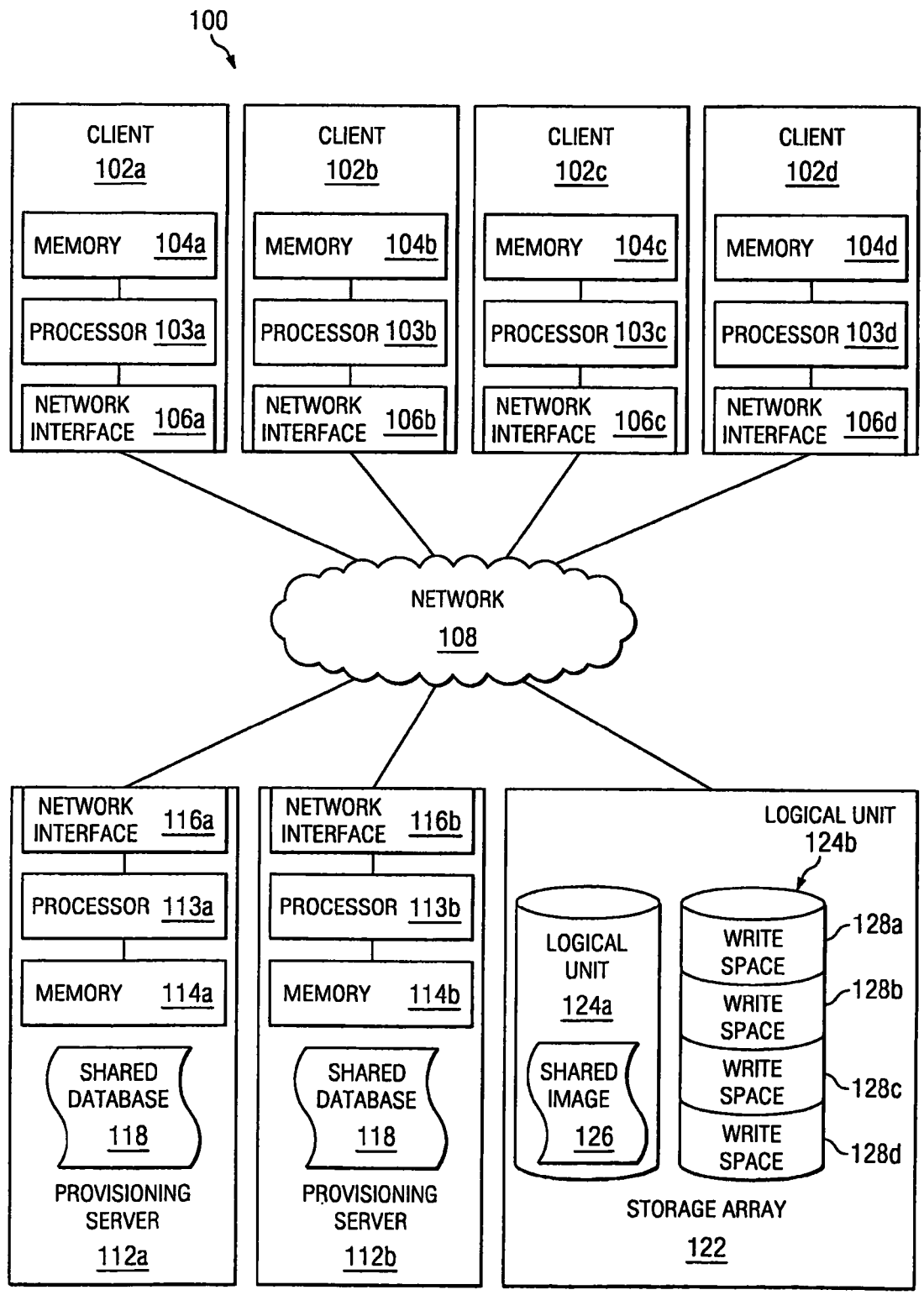
FIG. 1 illustrates a block diagram of an example system for providing access to a shared system image, in accordance with the teachings of the present disclosure.

Preferred embodiments and their advantages are best understood by reference to FIGS. 1-7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

FIG. 1 illustrates a block diagram of an example system 100 for providing access to a shared system image 126, in accordance with the teachings of the present disclosure. As depicted, system 100 may include one or more clients 102, a network 108, one or more provisioning servers 112, and a storage array 122.

Each client 102 may comprise an information handling system and may generally be configured to communicate via network 108 with one or more of provisioning servers 112. Each client may be configured to access storage array 122 via the one or more provisioning servers 112. In certain embodiments, one or more of clients 102 may be a server. In another embodiment, one or more of clients 102 may be a personal computer (e.g., a desktop computer or a portable computer). As depicted in FIG. 1, each client 102 may include a processor 103, a memory 104 communicatively coupled to processor 103, and a network interface 106 communicatively coupled to processor 103. Although system 100 is depicted as having four clients 102, system 100 may include any suitable number of clients 102.

Each processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage array 122 and/or another component of system 100.

Each memory 104 may be communicatively coupled to its associated processor 103 and may include any system, device, or apparatus configured to retain program instructions and/or data for a period of time (e.g., computer-readable media). Each memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated client 102 is turned off.

Each network interface 106 may include any suitable system, apparatus, or device operable to serve as an interface between its associated client 102 and network 108. Each network interface 106 may enable its associated client 102 to communicate over network 108 using any suitable transmission protocol and/or standard, including without limitation all transmission protocols and/or standards enumerated below with respect to the discussion of network 108.

Network 108 may be a network and/or fabric configured to couple clients 102, provisioning servers 112, and storage array 122 to one another. As an example, in certain embodiments, network 108 in connection with one or more of provisioning servers 112 may allow one or more of clients 102 to connect to logical units 124 such that portions of logical units 124 assigned to a particular client 102 appear to such particular client 102 as locally attached storage resources. In the same or alternative embodiments, network 108 may include a communication infrastructure, which provides physical connections, and a management layer, which organizes the physical connections, clients 102, provisioning servers 112, and storage array 122. In the same or alternative embodiments, network 108 may allow block I/O services and/or file access services to logical units 124 of storage array 122. Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data, and/or messages (generally referred to as data). Network 108 may transmit data using any storage and/or communication protocol, including without limitation, Fibre Channel, Frame Relay, Asynchronous Transfer Mode (ATM), Internet protocol (IP), other packet-based protocol, small computer system interface (SCSI), advanced technology attachment (ATA), serial ATA (SATA), advanced technology attachment packet interface (ATAPI), serial storage architecture (SSA), integrated drive electronics (IDE), and/or any combination thereof. Network 108 and its various components may be implemented using hardware, firmware, software, or any combination thereof.

Each provisioning server 112 may comprise an information handling system and may generally be operable to communicate via network 108 with one or more of clients 102 and storage array 122. In operation, each provisioning server may manage the access of one or more clients 102 to storage array 122, as described in greater detail elsewhere in this disclosure. As depicted in FIG. 1, each provisioning server 112 may include a processor 113, a memory 114 communicatively coupled to processor 113, a network interface 116 communicatively coupled to processor 113, and a shared database 118. Each processor 113, memory 114, and network interface 116 may be similar or identical in structure and/or functionality to processor 103, memory 104, and network interface 106, respectively. Although system 100 is depicted as having two provisioning servers 112, system 100 may include any suitable number of provisioning servers 112.

Shared database 118 may include a table and/or other suitable data structure that represents one or more mappings or relationships among clients 102, provisioning servers 112, and write spaces 128 of logical unit 124b. Shared database 118 may be stored on any suitable computer-readable medium associated with each provisioning server 112, including without limitation a storage resource (e.g., disk drive) associated with provisioning server 112 and/or memory 113 of provisioning server 112. As described in greater detail elsewhere in this disclosure, each provisioning server may use data stored in shared database 118 to manage access of clients 102 to logical units 124 of storage array 122. In certain embodiments, the content of shared database 118 on one provisioning server 112 may be similar or identical to the content of shared database 118 on one or more other provisioning servers 112.

Storage array 122 may include any suitable number and/or combination of storage resources configured to store data. Such storage resources may include hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage array 122 may include one or more storage enclosures configured to hold and/or power one or more of such storage resources. As depicted in FIG. 1, the storage resources of storage array 122 may be configured to appear to an information handling system as one or more logical units 124. For example, each logical unit 124 may include one or more storage resources logically combined to appear as single logical storage unit to one or more of clients 102 and provisioning servers 112.

As shown in FIG. 1, logical unit 124a may include a shared image 126 stored thereon. Shared image 126 may include data and/or programs that are shared by more than one client 102 (e.g., such data and/or programs are used by more then one client 102). For example, shared image 126 may include an operating system configured to run on more than one client 102. In addition or alternatively, shared image 126 may serve as a boot image to more than one client 102. Furthermore, in addition or in the alternative to having a common operating system and/or boot image for more than one client 102, shared image 126 may include application programs, drivers, other programs, and/or data shared by more than one client 102.

Also as shown in FIG. 1, logical unit 124b may include one or more partitions, wherein each such partition includes a write space 128. Each such write space 128 may include a dedicated logical unit that may include data and/or programs for use by a particular client 102 and/or user. For example, write space 128a may include data and/or programs for use by client 102a, write space 128b may include data and/or programs for use by client 102b, write space 128c may include data and/or programs for use by client 102c, and write space 128d may include data and/or programs for use by client 102d. In certain embodiments, one or more of write spaces 128 may include the differences or "deltas" from the shared image 126 that are associated with a particular client 102. In the same or alternative embodiments, one or more of write spaces may be "thin clones" of shared image 126. Thin cloning allows creation of an image template with minimal storage resource usage. Shared image 126 may be "cloned" for an individual client 102 by creating an individual write space 128 which may only require disk space to store differences or "deltas" from shared image 126 on the particular write space 128.

In certain embodiments, partitions for write spaces 128 may be created and/or managed using thin provisioning (also known as "sparse volumes"). Generally speaking, thin provisioning is a mechanism that applies to large-scale centralized computer disk storage systems, SANs, and storage virtualization systems. Thin provisioning allows write spaces 128 to be easily allocated to clients 102, on a "just-enough" and/or "just-in-time" basis. Thin provisioning allows maintenance of a single free space buffer pool (e.g., logical unit 124b) to service the data requirements of clients 102.

Although FIG. 1 depicts logical unit 124b having four write spaces 128, logical unit 124b (and system 100 in general) may have any suitable number of write spaces 128.

Figure 2:
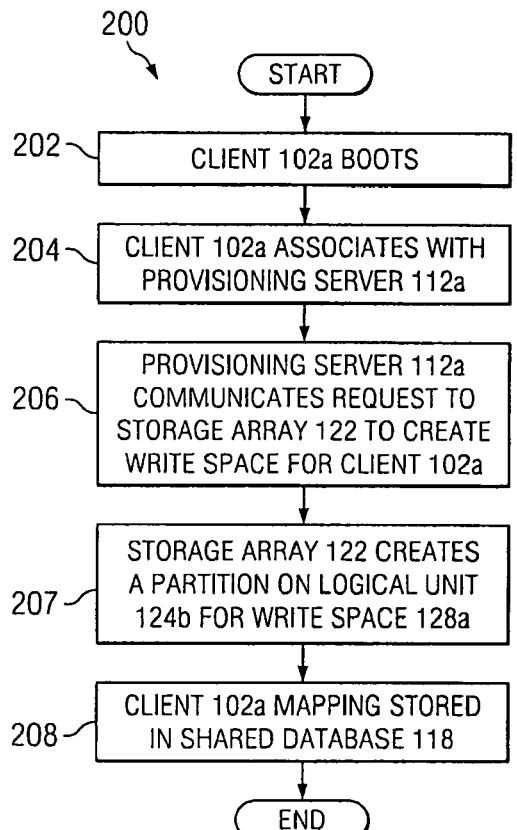
FIG. 2 illustrates a block diagram of an example method for initializing a client for access to a shared system image, in accordance with the teachings of the present disclosure.

FIG. 2 illustrates a block diagram of an example method 200 for initializing a client for access to a shared system image, in accordance with the teachings of the present disclosure. According to one embodiment, method 200 preferably begins at step 202. As noted above, teachings of the present disclosure may be implemented in a variety of configurations of system 100. As such, the preferred initialization point for method 200 and the order of the steps 202-208 comprising method 200 may depend on the implementation chosen.

The discussion of method 200 below will apply, solely for the purposes of clarity and exposition, to the operation of method 200 to client 102*a* and provisioning server 112*a*. However, method 200 may be applied to any suitable component of system 100.

At step 202, client 102*a* may boot. Client 102*a* may be booted in any suitable manner (e.g., powering on of client 102*a*, logging on by a user of client 102*a*, remote command to boot client 102*a*).

At step 204, client 102*a* may discover the existence of provisioning server 112*a* and associate with such provisioning server 112*a*. The association between client 102*a* and provisioning server 112*a* may be established in any suitable manner. For example, either of client 102*a* or provisioning server 112*a* may include metadata representing that client 102*a* and provisioning server 112*a* are to be associated, if such association is possible (e.g., provisioning server 112*a* is operating correctly). As another example, provisioning server 112*a* (e.g., instead of provisioning server 112*b* or another provisioning server) may be associated with client 102*a* on a random basis (e.g., provisioning server 112*a* randomly assigned to client 102*a* at boot of client 102*a*). As a further example provisioning server 112*a* (e.g., instead of provisioning server 112*b* or another provisioning server) may be associated with client 102*a* based one or more operational parameters associated with client 102*a*, provisioning servers 112, and/or other components of system 100 (e.g., the number of clients already assigned to each provisioning server 112, the proximity of client 102*a* to each provisioning server 112, the communication speed between client 102*a* and each provisioning server 112, etc.).

At step 206, provisioning server 112*a* may issue a request to storage array 122 to create a partition on storage array 122 for a write space associated with client 102*a*.

At step 207, storage array 122 may allocate storage capacity and create a partition on logical unit 124*b* for write space 128*a* such that client 102*a* may use write space 128*a* as a dedicated write space. As mentioned above, in certain embodiments, write space 128*a* may be created as a thin clone of shared image 126. Also as mentioned above, such partition may be created and maintained using thin provisioning.

In certain embodiments, the request issued at step 206 and the partition creation of step 207 may be carried out in accordance with an application programming interface (API) command exposed by storage array 122 to provisioning server 112*a*. For example, an API may include a command Create (source, destination) that may be communicated from a provisioning server 112 to storage array 122. The command may cause storage array 122 to create a thin clone of the image associated with the variable source and assign the thin clone to a partition on a logical unit associated with the variable destination. On successful completion of the API command, storage array 122 may return a partition identifier associated with the partition of logical unit 124*b* to which the write space 128 has been assigned.

At step 208, provisioning server 112*a* may store the association or "mapping" of client 102*a* to provisioning server 112*a* and write space 128*a*. In certain embodiments, such association may be stored in shared database 118.

Figure 3:
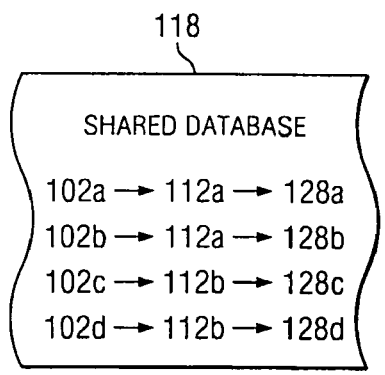
FIG. 3 illustrates a representation of an example shared database for use by one or more provisioning servers, in accordance with the teachings of the present disclosure.

FIG. 3 illustrates an example embodiment of shared database 118, in accordance with the present disclosure, depicting that client 102*a* is associated with provisioning server 112*a* and write space 128*a*. In certain embodiments, shared database 118 may also include information regarding a partition identifier of logical unit 124*b* associated with write space 128*a* (e.g., a partition identifier returned by storage array 122 in connection with the creation of write space 128*a*). In the same or alternative embodiments, modifications made to shared database 118 by one provisioning server 112 (e.g., by provisioning server 112*a*) may be communicated to all other provisioning servers of system 100 (e.g., to provisioning server 112*b*) so that all such provisioning servers 112 maintain a similar or identical copy of the shared image 118. As indicated by FIG. 3, the association of clients 102 with provisioning servers 112 may be shared or distributed among provisioning servers 112.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. In addition, steps 202-208 may be repeated, independently and/or collectively, as often as desired or required by a chosen implementation.

Method 200 may be implemented using system 100 or any other system operable to implement method 200. In certain embodiments, method 200 may be implemented partially or fully in software and/or firmware embodied in computer-readable media.

Once a client 102 is associated with a provisioning server 112 and/or write space 128, input/output (I/O) communications (e.g., read or write) initiated by such client may first be communicated to the provisioning server 112 associated with such client 102. The provisioning server 112 may then process the I/O communication based at least on the associations set forth in shared database 118. For example, in the event of a write-based I/O command, client 102*a* may communicate the write-based I/O command to its associated provisioning server 112*a*. Provisioning server 112*a* may then, based on the association to write space 128*a* set forth in shared database 118, communicate the write-based I/O command to storage array 122 for storage on write space 128*a*. As another example, in the event of a read-based I/O command, client 102 may communicate the read-based I/O command to its associated provisioning server 112*a*. Provisioning server 112*a* may then, based on the association to write space 128*a* set forth in shared database 118, communicate the read-based I/O command to storage array 122 to see if data stored on write space 128*a* is responsive to the read-based I/O command. If responsive data (e.g., previously-stored data specific to client 102*a*) is stored on write space 128*a*, storage array 122 may retrieve such data and communicate it to client 102*a*. On the other hand, if no responsive data to the read-based I/O command is stored on write space 128*a*, storage array 122 may retrieve the appropriate data from shared image 126 and communicate such shared image data to client 102*a*.

In some embodiments, the combination of shared image 126 and a write space 128 associated with a client 102 may be presented to a client 102 (e.g., by storage array 122) such that the shared image 126 and associated write space 128 appear to be the same logical unit to the client 102 (e.g., the logical unit presented to the client 102 "looks" like shared image 126, except to the extent modified by data present in an associated write space 128).

Although the above discussion of method 200 contemplates that a provisioning server 112 may create associations among itself, a client 102, and a write space 128 following a boot of a client 102, it is noted that not every boot of a client 102 necessarily invokes method 200. For example, in certain embodiments, after a client 102 boots, it may retain associations with a provisioning server 112 and/or write space 128 established during a previous boot, as such associations may be set forth in shared database 118.

Figure 4:
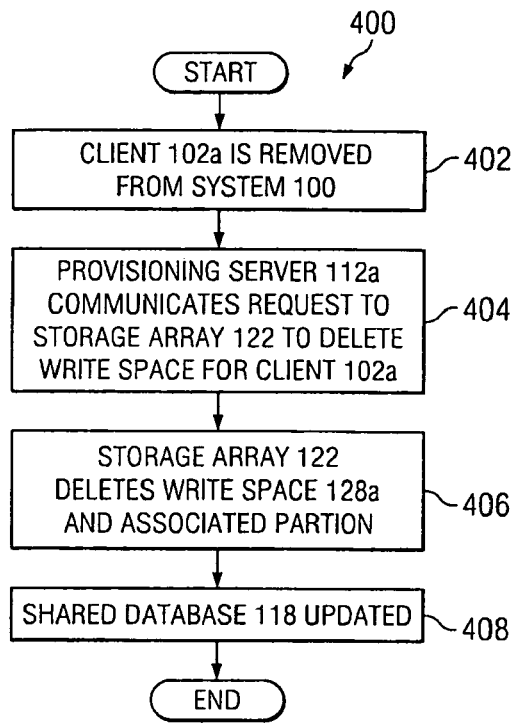
FIG. 4 illustrates a block diagram of an example method for deleting a write space associated with a client, in accordance with the teachings of the present disclosure.

FIG. 4 illustrates a block diagram of an example method 400 for deleting a write space 128 associated with a client 102, in accordance with the teachings of the present disclosure. According to one embodiment, method 400 preferably begins at step 402. As noted above, teachings of the present disclosure may be implemented in a variety of configurations of system 100. As such, the preferred initialization point for method 400 and the order of the steps 402-408 comprising method 400 may depend on the implementation chosen.

The discussion of method 400 below will apply, solely for the purposes of clarity and exposition, to the operation of method 400 to client 102a, provisioning server 112a and write space 128a. However, method 400 may be applied to any suitable component of system 100.

At step 402, client 102a may be removed from system 100. Removal from system 100 may include any event for which client 102a may no longer access storage array 122. For example, removal may include physical removal of client 102a from system 100. Removal may also include modification of user privileges for client 102a such that client 102a is no longer permitted to access storage array 122.

At step 404, provisioning server 112a may discover the removal of client 102a and communicate a request to storage array 122 to delete write space 128a for client 102a. Provisioning server 112a's discovery of the removal of client 102a may take place in any suitable manner. In some embodiments, provisioning server 112a may simply detect that client 102a has been removed or is no longer present. In other embodiments, provisioning server 112a may receive a message from client 102a or another client 102 indicating that client 102s has been removed.

At step 406, storage array 122 may delete write space 128a and/or the partition associated with write space 128a. In certain embodiments, the request issued at step 404 and the write space/partition deletion of step 406 may be carried out in accordance with an application programming interface (API) command exposed by storage array 122 to provisioning server 112a. For example, an API may include a command Delete (destination, partition identifier) that may be communicated from a provisioning server 112 to storage array 122. The command may cause storage array 122 to delete data in write space 128a and/or delete the partition associated with write space 128a, thus freeing up capacity of logical unit 124b to be allocated to other subsequently-created write spaces.

At step 408, provisioning server 112a may update the associations or mappings of clients 102 to indicate the removal of host 102a and deletion of write space 128a. In certain embodiments, such associations may be updated in shared database 118.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order. In addition, steps 402-408 may be repeated, independently and/or collectively, as often as desired or required by a chosen implementation.

Method 400 may be implemented using system 100 or any other system operable to implement method 400. In certain embodiments, method 400 may be implemented partially or fully in software and/or firmware embodied in computer-readable media.

Figure 5:
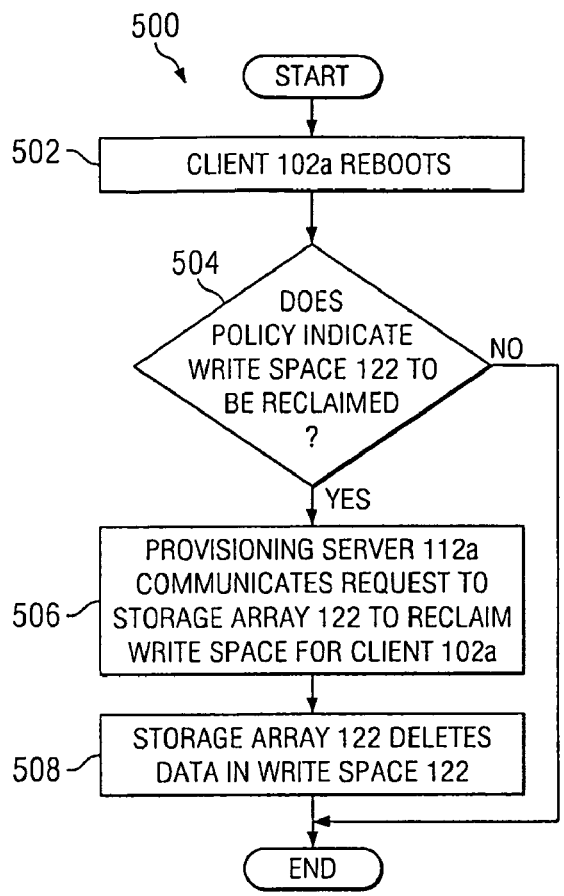
FIG. 5 illustrates a block diagram of an example method for reclaiming a write space associated with a client, in accordance with the teachings of the present disclosure.

FIG. 5 illustrates a block diagram of an example method 500 for reclaiming a write space 128 associated with a client 102, in accordance with the teachings of the present disclosure. According to one embodiment, method 500 preferably begins at step 502. As noted above, teachings of the present disclosure may be implemented in a variety of configurations of system 100. As such, the preferred initialization point for method 500 and the order of the steps 502-508 comprising method 500 may depend on the implementation chosen.

The discussion of method 500 below will apply, solely for the purposes of clarity and exposition, to the operation of method 500 to client 102a, provisioning server 112a and write space 128a. However, method 500 may be applied to any suitable component of system 100.

At step 502, client 102a may reboot in any suitable manner (e.g., powering on of client 102a, logging on by a user of client 102a, remote command to boot client 102a).

At step 504, provisioning server 112a may discover that client 102a has rebooted and may determine whether a policy present in either of provisioning server 112a (e.g., a policy for client 102a preset by an administrator) or client 102a (e.g., specified by a user of client 102a during a reboot process) indicates that write space 122a should be reclaimed. If the policy indicates that reclamation should take place, method 500 may proceed to step 506. Otherwise, if the policy dictates that reclamation should not take place, method 500 may end.

At step 506, in a response to a determination that a policy indicates that write space 122a should be reclaimed, provisioning server 112a may communicate a request to storage array 122 to reclaim write space 128a associated with client 102a.

At step 508, storage array 122 may delete data stored in write space 128a while maintaining the existing partition associated with write space 128a. Such reclamation of write space 128a may be desirable upon reboot in certain situations. For example, perceived security vulnerabilities associated with "data at rest" may lead to a desire to reclaim write spaces 128 at reboot (or shutdown) of their associated clients. As another example, reclamation may also be beneficial as it frees physical storage resource blocks associated with a thin-provisioned write space 128. Nonetheless, it may also be desirable in such situations to leave the partition for the write space intact, so as to reduce time associated with creation of a new write space upon reboot.

In certain embodiments, the request issued at step 506 and the write space reclamation of step 508 may be carried out in accordance with an application programming interface (API) command exposed by storage array 122 to provisioning server 112a. For example, an API may include a command ReclaimCapacity (destination, partition identifier) that may be communicated from a provisioning server 112 to storage array 122. The command may cause storage array 122 to delete data in write space 128a while maintaining the partition associated with write space 128a, thus reclaiming capacity of write space 128a to be used after reboot of host 102a.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order. In addition, steps 502-508 may be repeated, independently and/or collectively, as often as desired or required by a chosen implementation.

Method 500 may be implemented using system 100 or any other system operable to implement method 500. In certain embodiments, method 500 may be implemented partially or fully in software and/or firmware embodied in computer-readable media.

Figure 6:
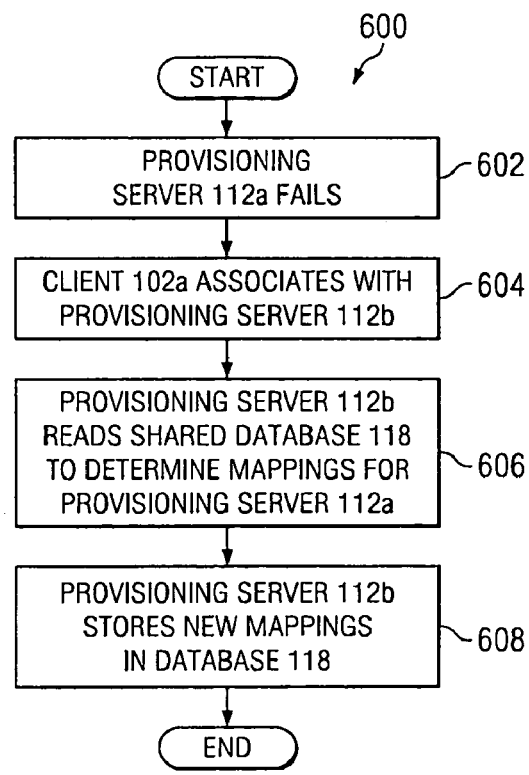
FIG. 6 illustrates a block diagram of an example method for re-establishing a client for access to a shared system image after failure of a provisioning server, in accordance with teachings of the present disclosure.

FIG. 6 illustrates a block diagram of an example method 600 for re-establishing a client 102 for access to a shared system image 124 after failure of a provisioning server 112a, in accordance with teachings of the present disclosure. According to one embodiment, method 600 preferably begins at step 602. As noted above, teachings of the present disclosure may be implemented in a variety of configurations of system 100. As such, the preferred initialization point for method 600 and the order of the steps 602-608 comprising method 600 may depend on the implementation chosen.

The discussion of method 600 below will apply, solely for the purposes of clarity and exposition, to the operation of method 600 to client 102a. However, method 600 may be applied to any suitable component of system 100.

At step 602, provisioning server 112a may fail. The failure may occur for any reason, including a fault of provisioning server 112a, a power failure, or other event affecting the operability of provisioning server 112a.

At step 604, as a result of the failure of provisioning server 112a, provisioning server 112b, client 102a, or another component of system 100 may determine that provisioning server 112a has failed, and client 102a may associate with provisioning server 112b. The association between client 102a and provisioning server 112b may be established in any suitable manner. For example, either of client 102a or provisioning server 112b may include metadata representing that client 102a and provisioning server 112b are to be associated in the event of a failure of provisioning server 112b, if such association is possible (e.g., provisioning server 112b is operating correctly). As another example, provisioning server 112b (e.g., instead of another provisioning server 112) may be associated with client 102a on a random basis. As a further example, provisioning server 112b (e.g., instead of another provisioning server 112) may be associated with client 102a based one or more operational parameters associated with client 102a, provisioning servers 112, and/or other components of system 100 (e.g., the number of clients already assigned to each provisioning server 112, the proximity of client 102a to each provisioning server 112, the communication speed between client 102a and each provisioning server 112, etc.).

At step 606, provisioning server 112b may read shared database 118 to determine the existing associations and mappings for clients 102 formerly associated with failed provisioning server 112a. From reading shared database 118, provisioning server 112b may determine that client 102a was associated with write space 128a.

At step 608, based at least on the existing associations read from shared database 118 provisioning server 112b may update the association or "mapping" of client 102a to provisioning server 112b and write space 128a. In certain embodiments, such association may be stored in shared database 118.

Figure 7:
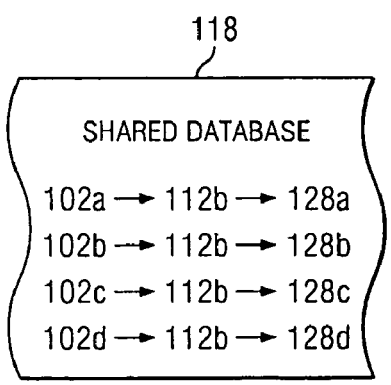
FIG. 7 illustrates a representation of the shared database depicted in FIG. 3 after failure of a provisioning server, in accordance with the teachings of the present disclosure.

FIG. 7 illustrates an example embodiment of shared database 118, in accordance with the present disclosure, depicting that client 102a is associated with provisioning server 112b and write space 128a. The ability of components to re-establish associations from data stored in shared database 118 allows for high availability of shared image 126 and write spaces 128.

Although FIG. 6 discloses a particular number of steps to be taken with respect to method 600, method 600 may be executed with greater or lesser steps than those depicted in FIG. 6. In addition, although FIG. 6 discloses a certain order of steps to be taken with respect to method 600, the steps comprising method 600 may be completed in any suitable order. In addition, steps 602-608 may be repeated, independently and/or collectively, as often as desired or required by a chosen implementation.

Method 600 may be implemented using system 100 or any other system operable to implement method 600. In certain embodiments, method 600 may be implemented partially or fully in software and/or firmware embodied in computer-readable media.

Using the methods and systems disclosed herein, problems associated with providing access to remote shared images may be improved, reduced, or eliminated. For example, the methods and systems herein allow for high availability provisioning of a shared image and associated user write spaces, without the necessity of a clustered file system.

Although the present disclosure has been described in detail, it should be understood that various changes, substitutions, and alterations can be made hereto without departing from the spirit and the scope of the disclosure as defined by the appended claims.

What is claimed is:

1. A method for providing access to a remote shared image, comprising:
   receiving from a first provisioning server a request to create a write space for a client communicatively coupled to the first provisioning server;
   creating a partition on a first logical unit disposed in a storage array, the first logical unit communicatively coupled to the first provisioning server and associated with the client;
   storing a thin clone of a shared image on the partition, the shared image common to the client and at least one other client and stored on a second logical unit, the thin clone comprising a write space for data specific to the client; and
   storing parameters indicative of the association among the client, the first provisioning server, and the write space associated with the client in a database shared by a plurality of provisioning servers and embodied in non-transitory computer readable media.

2. A method according to claim 1, comprising:
   detecting a failure of the first provisioning server;
   associating the client with a second provisioning server selected from the plurality of provisioning servers;
   determining, by the second provisioning server, that the write space is associated with the client based at least on parameters stored in the database; and
   managing, by the second provisioning server, input/output operations communicated between the client and the partition and input/output operations communicated between the client and the shared image.

3. A method according to claim 2, comprising storing parameters indicative of the association among the client, the second provisioning server, and the write space associated with the client in the database.

4. A method according to claim 1, comprising creating the partition using thin provisioning.

5. A method according to claim 1, further comprising:
   receiving, by the storage array, a request to delete the partition associated with the client; and
   deleting, by the storage array, the partition associated with the client.

6. A method according to claim 1, comprising:
   receiving, by the storage array, a request to reclaim the write space associated with the client; and
   reclaiming, by the storage array, the write space associated with the client.

7. A method according to claim 1, wherein the first provisioning server is configured to manage at least one of: (a) input/output operations communicated between the client and the partition on the first logical unit and (b) input/output operations communicated between the client and the shared image.

8. A system for providing access to a remote shared image, comprising:
a client;
a storage array having:
a first logical unit having stored thereon a shared image common to the client and at least one other client; and
a second logical unit; and
a plurality of provisioning servers communicatively coupled to the client and the storage array, wherein a first provisioning server of the plurality of provisioning servers is configured to:
manage input/output operations communicated between the client and the partition and input/output operations communicated between the client and the shared image; and
store parameters indicative of the association among the client, the first provisioning server, and the write space associated with the client in a database shared by the plurality of provisioning servers and embodied in non-transitory computer readable media;
wherein the storage array is configured to:
receive from the first provisioning server a request to create a write space for the client;
create a partition on a first logical unit; and
store a thin clone of the shared image on the partition the thin clone comprising a write space for data specific to the client.

9. A system according to claim 8, wherein a second provisioning server of one of the plurality of provisioning servers is configured to:
detect a failure of the first provisioning server;
associate the client with the second provisioning server;
determine that the write space is associated with the client based at least on parameters stored in the database; and
manage input/output operations communicated between the client and the partition and input/output operations communicated between the client and the shared image.

10. A system according to claim 9, the second provisioning server further configured to store parameters indicative of the association among the client, the second provisioning server, and the write space associated with the client in the database.

11. A system according to claim 8, the storage array further configured to create the partition using thin provisioning.

12. A system according to claim 8, the storage array further configured to:
receive a request to delete the partition associated with the client; and
delete the partition associated with the client.

13. A system according to claim 8, the storage array further configured to:
receive a request to reclaim the write space associated with the client; and
reclaim the write space associated with the client.

14. Software embodied on a non-transitory computer-readable media, the software configured to, when executed by a processor:
receive from a provisioning server a request to create a write space for a client communicatively coupled to the first provisioning server;
create a partition on a first logical unit disposed in a storage array, the first logical unit communicatively coupled to the provisioning server and associated with the client;
store a thin clone of a shared image on the partition, the shared image common to the client and at least one other client and stored on a second logical unit, the thin clone comprising a write space for data specific to the client; and
store parameters indicative of the association among the client, the first provisioning server, and the write space associated with the client in a database shared by the plurality of provisioning servers and embodied in non-transitory computer readable media.

15. Software according to claim 14, the software further configured to, when executed by a processor, create the partition using thin provisioning.

16. Software according to claim 14, the software further configured to, when executed by a processor:
receive a request to delete the partition associated with the client; and
delete the partition associated with the client.

17. Software according to claim 14, the software further configured to, when executed by a processor:
receive a request to reclaim the write space associated with the client; and
reclaim the write space associated with the client.

18. Software according to claim 14, wherein the provisioning server is configured to manage at least one of: (a) input/output operations communicated between the client and the partition on the first logical unit and (b) input/output operations communicated between the client and the shared image.

* * * * *